(12) United States Patent
Buschnakowski et al.

(10) Patent No.: US 9,285,247 B2
(45) Date of Patent: Mar. 15, 2016

(54) CABLE CIRCUIT WITH DIGITAL SIGNAL CONDITIONING

(71) Applicant: Endress + Hauser Conducta Gesellschaft für Mess- und Regeltechnik mbH + Co. KG, Gerlingen (DE)

(72) Inventors: Stephen Buschnakowski, Chemnitz (DE); Torsten Pechstein, Radebeul (DE); Stefan Robl, Gerlingen (DE); Sven-Matthias Scheibe, Dresden (DE); Tobias Mieth, Dresden (DE)

(73) Assignee: Endress + Hauser Conducta Gesellschaft für Mess- und Regeltechnik mbH + Co. KG, Gerlingen (DE)

( * ) Notice: Subject to any disclaimer, the term of this patent is extended or adjusted under 35 U.S.C. 154(b) by 349 days.

(21) Appl. No.: 13/776,826

(22) Filed: Feb. 26, 2013

(65) Prior Publication Data

US 2013/0231896 A1    Sep. 5, 2013

Related U.S. Application Data

(62) Division of application No. 12/734,113, filed as application No. PCT/EP2008/063471 on Oct. 8, 2008, now Pat. No. 8,396,683.

(51) Int. Cl.
*G01D 7/00* (2006.01)
*G01D 21/00* (2006.01)
(Continued)

(52) U.S. Cl.
CPC .................. *G01D 7/00* (2013.01); *G01D 21/00* (2013.01); *G08C 17/06* (2013.01); *G08C 19/36* (2013.01); *H01F 38/14* (2013.01); *H01F 27/40* (2013.01); *H01F 2038/143* (2013.01)

(58) Field of Classification Search
USPC .......................................................... 702/127
See application file for complete search history.

(56) References Cited

U.S. PATENT DOCUMENTS

| 7,061,407 | B1 | 6/2006 | Lee |
| 7,587,953 | B2 | 9/2009 | Wittmer |
| 2006/0254911 | A1 | 11/2006 | Lindmueller |

FOREIGN PATENT DOCUMENTS

| DE | 102 18 606 A1 | 11/2003 |
| DE | 102 20 450 A1 | 11/2003 |

(Continued)

OTHER PUBLICATIONS

Xiping Yang, Design of a Wireless Sensor Network for Long-term, In-Situ Monitoring of an Aqueous Environment, Sensors, ISSN 1424-8220© 2002 by MDPI, http://www.mdpi.net/sensors, p. 455-472.*

(Continued)

*Primary Examiner* — Tung S Lau
(74) *Attorney, Agent, or Firm* — Bacon & Thomas, PLLC (57) ABSTRACT

A cable circuit includes a contactless interface for signal transmission between the cable circuit and the sensor module, wherein the sensor module is galvanically isolated from the cable circuit, and wherein signal transmission between the cable circuit and the sensor module occurs on an optical, inductive or capacitive path. Additionally, the cable circuit includes a signal processing unit, as well as a cable interface for connecting a cable, which connects the cable circuit with the measurement transmitter. The signal processing unit is integrated into the signal path. The signal processing unit is embodied to receive, via the cable interface, signals from the measurement transmitter, to condition them and to transmit them via the contactless interface to the sensor module, and to receive, via the contactless interface, signals from the sensor module, to condition them and to transmit them via the cable interface to the measurement transmitter.

2 Claims, 4 Drawing Sheets

(51) Int. Cl.
*G08C 17/06* (2006.01)
*G08C 19/36* (2006.01)
*H01F 38/14* (2006.01)
*H01F 27/40* (2006.01)

(56) References Cited

FOREIGN PATENT DOCUMENTS

| | | |
|---|---|---|
| DE | 103 13 639 A1 | 10/2004 |
| DE | 103 44 262 A1 | 4/2005 |
| EP | 1 600 736 A2 | 11/2005 |
| WO | WO 02/054013 A2 | 7/2002 |
| WO | WO 03/096139 A2 | 11/2003 |
| WO | WO 2004 084514 | 9/2004 |
| WO | WO 2005/031339 A1 | 4/2005 |

OTHER PUBLICATIONS

International Search Report, Jun. 16, 2009, The Netherlands.
German Search Report, Mar. 2008, Munich.
Robert Racz, "Novel Contactless Current Sensors for HEV-EV and Renewable Energy Applications", Oct. 27, 2010, 3 pages.

* cited by examiner

CABLE CIRCUIT WITH DIGITAL SIGNAL CONDITIONING

CROSS-REFERENCE TO RELATED APPLICATION

This application is a Divisional of U.S. application Ser. No. 12/734,113, which was filed on Apr. 12, 2010, and is the U.S. National Stage proceeding of PCT/EP2008/063471, which was filed on Oct. 8, 2008 and claims the priority of German application 102007048812.4 filed on Oct. 10, 2007.

TECHNICAL FIELD

The invention relates to a cable circuit as well as to a system for measurement data transmission. Furthermore, the invention relates to a method for measurement signal transmission.

BACKGROUND DISCUSSION

In process automation technology, many different sensors are applied for registering process variables. Examples of such sensors are pH-sensors, gas sensors, flow sensors, mass flow sensors, etc. In modern industrial plants, such sensors are often operated under difficult environmental conditions; for example, the sensors are exposed to corrosive chemicals, heat, vibrations, etc.

For connection of these sensors to a superordinated measuring system, it has proved beneficial to couple the sensors via a contactless interface with a cable circuit, which is connected via a cable with a measurement transmitter. The contactless interface can be, for example, an optical interface, a capacitive interface or an inductive interface. Through use of a contactless interface, wear susceptible, electrical contacts are avoided. Since such a sensor module has no openings for electrical contacts, the surface of the sensor module is hermetically sealed. The surface material of the sensor module surrounds the sensor module completely and can be matched to the particular purpose of use, or to the particular corrosive medium.

German patent application 102 18 606 A1 describes a potentiometric sensor. A potentiometric sensor, especially a pH-sensor or a redox sensor, includes: a transducer for registering a potentiometric variable, especially a pH-value or a redox-potential; and an interface for output to a superordinated unit, especially a transmitter, of a signal dependent on the potentiometric variable. In such case, the potentiometric sensor includes a digital data memory, which is connected permanently with the transducer.

In German patent application DE 103 13 639 A1, an electrochemical gas sensor is described. The gas sensor module includes: a transducer for registering a gas concentration; a digital data memory for storing sensor data or process data; and a contactless interface for connection to a superordinated unit for energy supply of the gas sensor module and for data exchange between the gas sensor module and the superordinated unit.

SUMMARY OF THE INVENTION

An object of the invention is to improve the quality of data transmission between the sensor module and the cable circuit.

The present invention relates to a cable circuit, which is coupled with a sensor module via a contactless interface. Via a cable, the cable circuit is connected with a measurement transmitter. For improving signal transmission, a signal processing unit, for example, a microcontroller, is integrated in the cable circuit into the signal transmission path. The signal processing unit is responsible for signal conditioning of data transmitted in both directions between measurement transmitter and sensor module.

Data, which are sent by the measurement transmitter via the cable to the cable circuit, is received and evaluated by the signal processing unit. Then, the signal processing unit sends the data via the contactless interface to the sensor module.

In the reverse transmission direction, the cable circuit receives via the contactless interface data from the sensor module. The data is received by the signal processing unit, conditioned and sent via the cable interface to the measurement transmitter.

The signal processing unit inserted into the signal path acts in both transmission directions as a repeater. Through the receiving and renewed sending of the data, the quality of the transmitted signals is improved. Especially, deteriorated edges are repaired, and timing of the received signals is corrected. The qualitative improving of the signals in the cable circuit leads to an improved transmission quality for the data exchange between the sensor module and the measurement transmitter. Through use of the solution of the invention, the number of transmission errors can be lessened.

Besides improving the transmission quality, integration of the signal processor into the signal path offers still other advantages. In a preferred form of embodiment, via the signal processing unit, an index structure can be provided, which enables an addressing of particular parameters of the cable circuit. In this way, particular parameters of the cable circuit can be accessed from the measurement transmitter. Especially, the measurement transmitter can, with the assistance of the index structure, query, from the cable circuit, information on type, manufacturer, serial number and software version of the cable circuit. Parameters of the cable circuit and the sensor module can be separately addressed from the measurement transmitter.

The integration of the signal processing unit into the signal path of the cable circuit offers, moreover, other advantages. In a preferred form of embodiment, information exchange can take place between the cable circuit and the sensor module, in the case of which the two units inform one another concerning the other's supported functionalities.

In an advantageous form of embodiment of the invention, the cable circuit impresses its own information on telegrams transmitted from the measurement transmitter to the sensor module, in order, in this way, to open a communication channel to the sensor module. Also the sensor module can impress on telegrams transmitted to the measurement transmitter information for the cable circuit. Preferably, unused bits of the telegrams are used for the information exchange between cable circuit and sensor module.

Via this information exchange, the cable circuit can transmit a request to the sensor module concerning which functions are supported by the sensor module. As response thereto, the sensor module can impress, on a telegram transmitted to the measurement transmitter, information concerning which functions it supports. In this way, the cable circuit receives knowledge concerning the abilities of the sensor module.

In a preferred form of embodiment of the invention, it is decided, on the side of the cable circuit, whether for data transmission via the contactless interface a change should be made to an alternative coding method. With help of the signal processing unit integrated into the signal path, an advantageous coding method for data transmission via the contactless interface can be negotiated.

In a preferred form of embodiment, for the transmission via the contactless interface, a coding method alternative to the coding method "non-return to zero" (NRZ) frequently used in the state of the art is used. In a preferred form of embodiment, for example, the 8B10B encoding method or the Manchester encoding method can be applied for data transmission via the contactless interface. In this way, quality of the data transmission via the contactless interface is improved.

BRIEF DESCRIPTION OF THE DRAWINGS

The invention will now be explained in greater detail on the basis of several examples of embodiments illustrated in the drawing, the figures of which show as follows.

DETAILED DISCUSSION IN CONJUNCTION WITH THE DRAWINGS

Figure 1:
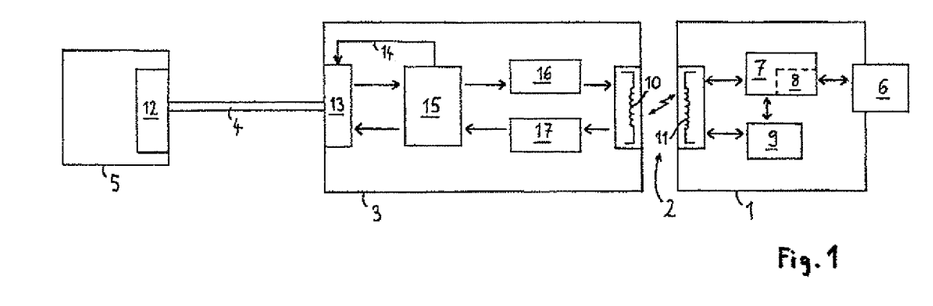
FIG. 1 is a data exchange between the measurement transmitter, the cable circuit and the sensor module.

FIG. 1 shows a system of the invention for registering and forwarding measured values. The system includes a sensor module 1, which communicates with a cable circuit 3 via a contactless interface 2. The term "contactless" means in such case that the sensor-side interface is electrically or galvanically isolated from the transmitter-side interface. The contactless interface 2 can be embodied, for example, as an optical, capacitive or inductive interface. In FIG. 1, an inductive interface is illustrated. In order to be able to forward registered data to a superordinated system, the cable circuit 3 is connected via a cable 4 with a measurement transmitter 5. The measurement transmitter 5 can, on its part, be coupled to a fieldbus.

The sensor module 1 includes a transducer 6. The transducer 6 can be, for example, a volume flow sensor, a mass flow sensor, a pH sensor, a gas sensor or some other sensor. Additionally, the sensor module 1 includes a microprocessor 7, which preferably is equipped with an integrated analog to digital converter (ADC) 8, in order to be able to convert the analog measured values registered by the transducer 6 into corresponding digital values. Preferably, the sensor module 1 includes, moreover, a digital data memory 9, in which sensor data or process data can be stored. Preferably stored in the digital data memory 9 are also calibration data for the particular transducer 6, with whose help the analog signals delivered by the transducer 6 can be converted into corresponding physical, measured values. The calibration values ascertained for the transducer 6 can be stored within the sensor module 1 such that there is a fixed association of the calibration data with the transducer 6. Since each sensor module 1 bears its own calibration data, mix-ups between different sets of calibration data are prevented.

In the case of the form of embodiment illustrated in FIG. 1, the contactless interface 2 is embodied as an inductive interface. The inductive interface includes a primary winding 10 arranged on the side of the cable circuit 3 as well as a secondary winding 11 arranged on the side of the sensor module 1. When the sensor module is plugged onto the cable circuit 3 by means of a pluggable connector coupling, the primary winding 10 and the secondary winding 11 are brought into a defined spatial position with respect to one another, so that high frequency signals can be transmitted in both directions between the cable circuit 3 and the sensor module 1. In this way, data exchange between cable circuit 3 and sensor module 1 is enabled. Moreover, also the energy supply of the sensor module 1 can occur via the inductive interface. In this regard, the high-frequency signal produced by the cable circuit 3 is received through the secondary winding 11 of the sensor module 1 and rectified, in order, in this way, to produce an operating voltage for the microprocessor 7, for the digital data memory 9 and possibly also for the transducer 6.

In addition to the contactless interface 2, the cable circuit 3 includes an interface for cable 4, via which data exchange with the measurement transmitter 5 is conducted. In the case of the form of embodiment illustrated in FIG. 1, the data transmission between measurement transmitter 5 and cable circuit 3 occurs corresponding to the standard EIA-485. For changing the signals to be transmitted into the standard EIA-485, the measurement transmitter 5 includes an EIA-485 interface converter 12, and also the cable circuit 3 is equipped with an EIA-485 interface converter 13.

The entire communication between the measurement transmitter 5, the cable circuit 3 of and the sensor module 1 occurs in half duplex operation. This means, that data are transmitted either from the measurement transmitter 5 via the cable circuit 3 to the sensor module 1 or else in the reverse direction from the sensor module 1 via the cable circuit 3 to the measurement transmitter 5. A simultaneous sending and receiving of data is not possible in half duplex operation. The particular transmission direction is specified in such case by a direction signal 14, which is produced by a microcontroller 15 in the cable circuit 3. The microcontroller 15 reverses the direction of the data transmission whenever the transmission of a so-called "telegram" is finished.

First, the data transmission direction is so set, that data can be transmitted from the measurement transmitter 5 to the sensor module 1. The telegram to be transmitted is encoded by the interface converter 12 and transmitted via the cable 4 to the cable circuit 3. The received data are decoded by the interface converter 13 and fed to the Rx input of the microcontroller 15.

In contrast to the state of the art, the microcontroller 15 is, in the case of the cable circuit 3 of the invention, integrated into the signal path. The microcontroller 15 receives the signal applied to the Rx input, conditions it and sends the signal to the modulator 16. The microcontroller 15 inserted into the signal path thus acts as a repeater. The conditioned signal enters the modulator 16, which modulates a high-frequency signal for the transmission via the inductive interface corresponding to the data to be transmitted. The modulated high-frequency signal is transmitted from the primary winding 10 to the secondary winding 11 and can then be evaluated in the sensor module 1 by the processor 7.

The microcontroller 15 detects when transmission of the telegram from the measurement transmitter 5 to the sensor module 1 has ended, and then reverses the transmission direction. Now, data can be transmitted in the reverse direction from the sensor module 1 via the cable circuit 3 to the measurement transmitter 5. In the sensor module 1, the telegram to be transmitted is modulated by the microprocessor 7 onto a high-frequency signal. The modulated high-frequency signal is transmitted via the secondary winding 11 to the primary winding 10 and enters from there into the demodulator 17. The demodulator 17 extracts the modulated data from the high-frequency signal and forwards this data to the microcontroller 15 integrated into the signal path. The microcontroller 15 conditions the data obtained from the demodulator 17 and sends these data via its Tx output to the EIA-485 interface converter 13. The microcontroller 15 inserted into the signal path thus also acts in the reverse transmission direction as a repeater for the data received from the sensor module 1. These data are then converted by the EIA-485 interface converter 13 into the standard EIA-485 and transmitted via the cable 4 to the measurement transmitter 5. There, the data are decoded by the EIA-485 interface converter 12.

Figure 2:
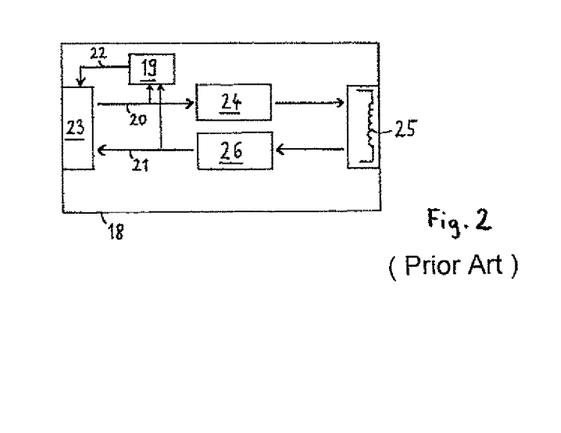
FIG. 2 is a block diagram of a cable circuit according to the state of the art.

For better understanding of the invention, a cable circuit 18 according to the state of the art is shown in FIG. 2. In the case of this cable circuit 18, the microcontroller 19 is not inserted into the signal path. The microcontroller 19 shown in FIG. 2 is only responsible for observing the data traffic on the signal lines 20, 21 and, as a function thereof, for producing a direction signal 22 for the revesing of the transmission direction. In the case of the cable circuit 18 of the state of the art, the signals received by the EIA-485 interface converter 23 enter the modulator 24 without further signal conditioning. The modulator 24 produces a high-frequency signal modulated corresponding to these data, which then is transmitted via the primary winding 25 to a sensor module. Along the signal path, the quality of the signal to be transmitted worsens, timing deteriorates, and edge steepness becomes partially lost. As a result, transmission errors can arise.

The same is true also for signal transmission in the reverse direction. The modulated high-frequency signal received by the primary winding 25 is fed to the demodulator 26, and the demodulated signal is forwarded without other signal conditioning directly to the EIA-485 interface converter 23. Also here there is a worsening of the signal quality along the transmission path, wherein timing is partially lost and signal edges deteriorate.

Through comparison of the solution of the invention illustrated in FIG. 1 with the solution of the state of the art illustrated in FIG. 2, it can be recognized that, by inserting the microcontroller 15 into the signal path, a repeater function can be implemented. The implementing of this repeater function requires no additional components. The microcontroller 15 is drawn into the data traffic, or transmission, and produces the received signals, in each case, anew. In this way, the received data are conditioned as regards timing and edge steepness. A worsening of signal quality along the transmission path is actively counteracted. The microcontroller eliminates, in both directions of the data communication, possible error caused by deteriorated edges or timing problems. Thus, measurement transmitter and sensor module receive signals of improved quality, and, as a result of the improved signal quality, frequency of transmission errors is lessened.

Figure 3:
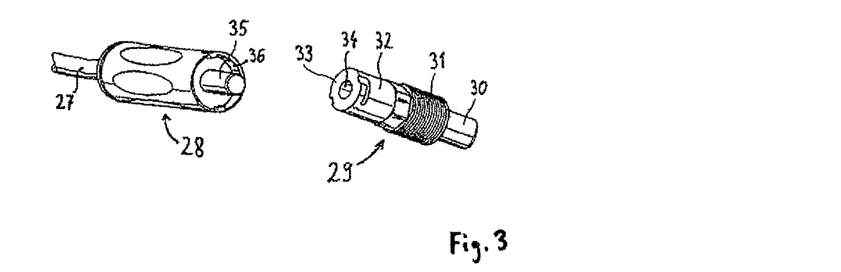
FIG. 3 is a form of embodiment of cable circuit and sensor module.

FIG. 3 shows a form of embodiment, of a cable circuit 28 arranged on the end of a cable 27. Moreover, a sensor module 29 is shown, which can be connected with the cable circuit 28 via a pluggable connector coupling, so that data, and energy, transmission can occur via the inductive interface. The sensor module 29 includes a transducer 30 for registering measured values. The housing of the sensor module 29 includes a screw thread 31, in order to be able to mount the sensor module 29 in a retractable assembly. On the end of the sensor module 29 facing away from the transducer 30 there is a cylindrical end section 32, in which a secondary winding 33 of an inductive interface is arranged. In the lateral wall of the cylindrical end section 32 are located cavities of a bayonet connector.

The cylindrical end section 32 of the sensor module 29 includes a frontside cavity 34, which serves for accommodating a cylindrical nose 35 formed on the housing of the cable circuit 28. Within the cylindrical nose 35 is located a ferrite core with the primary winding of the inductive interface. Upon the plugging of the cable circuit 28 onto the sensor module 29, the primary winding arranged within the nose 35 is brought into a defined spatial position relative to the secondary winding, so that data, and energy, transmission between the cable circuit 28 and the sensor module 29 can take place. The housing of the cable circuit 28 includes on its end a sleeve-like lateral wall 36, which protrudes axially and coaxially surrounds the nose 35. Upon plugging of the cable circuit 28 onto the sensor module 29, the sleeve-like lateral wall 36 surrounds at least one part of the cylindrical end section 32 of the sensor module 29. Radially inwardly extending protrusions on the sleeve-like lateral wall 36 are located then in engagement with the cavities of the bayonet connector and the pluggable connector coupling can be secured.

Figure 4:
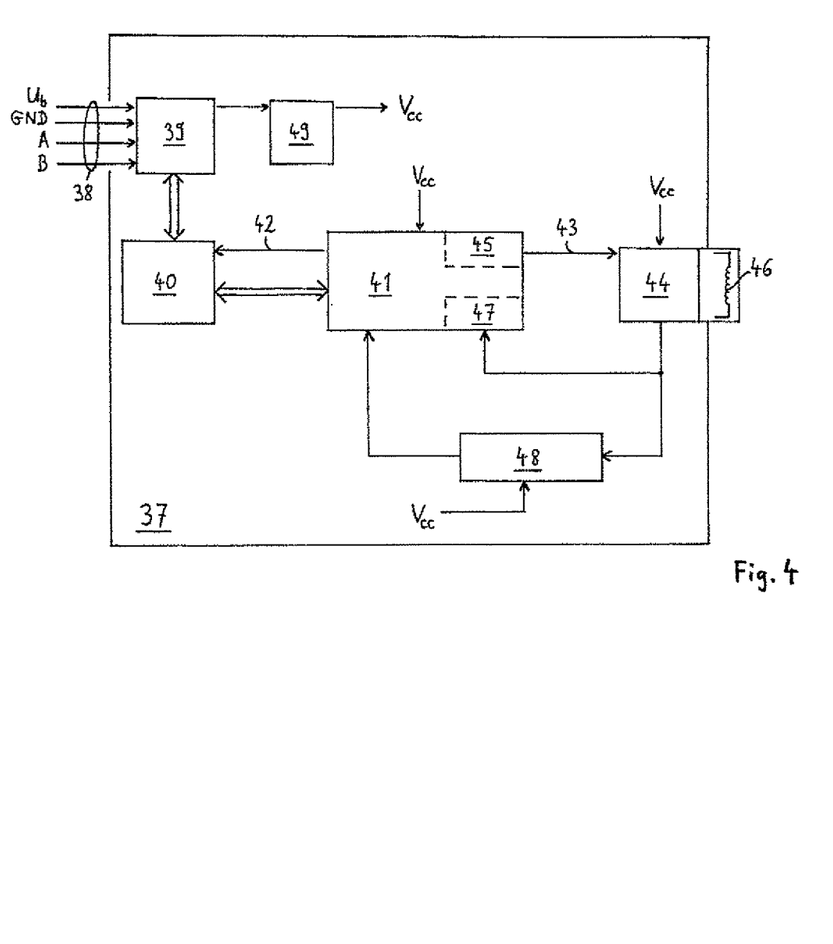
FIG. 4 is a block diagram of the cable circuit of the invention.

FIG. 4 shows a block diagram of a cable circuit 37 of the invention. The cable circuit 37 is connected via a cable 38 with a measurement transmitter. Cable 38 includes a voltage supply line $U_b$, a ground line GND, as well as two signal lines A and B, via the data can, in half duplex operation, be transmitted to the measurement transmitter, or received from the measurement transmitter. The signal lines A and B are connected via a filter 39 with an EIA-485 interface 40. Cable can be up to several hundred meters long. Thus, in-coupling of electromagnetic disturbances become possible on the transmission path between measurement transmitter and cable circuit. Filter 39 has the task of filtering these electromagnetic disturbances out, before the received data are led to the EIA-485 interface 40 and there decoded.

The decoded data are fed to the Rx input of the microcontroller 41. Microcontroller 41 is integrated both into the forward, as well as also the backward, transmission path. Moreover, microcontroller 41 produces a direction signal 42, which establishes the data transmission direction.

Microcontroller 41 converts the data obtained from the EIA-485 interface 40 into an driving signal 43 for a class E amplifier 44. In the case of the form of embodiment illustrated in FIG. 4, the microcontroller 41 produces the driving signal 43 with the assistance of modulator 45, which is implemented in software. It is, consequently, not required to have a separate modulator implemented in hardware for producing the driving signal 43. Instead, the driving signal 43 is produced by a signal processing routine stored in the microcontroller 41.

The class E amplifier 44 has the task of producing the high-frequency signal for the transmission via the inductive interface. By means of the driving signal 43, the data to be transmitted are modulated onto this high-frequency signal. The modulated high-frequency signal is fed to the primary winding 46 of the inductive interface and transmitted via the inductive interface to the sensor module.

Figure 5:
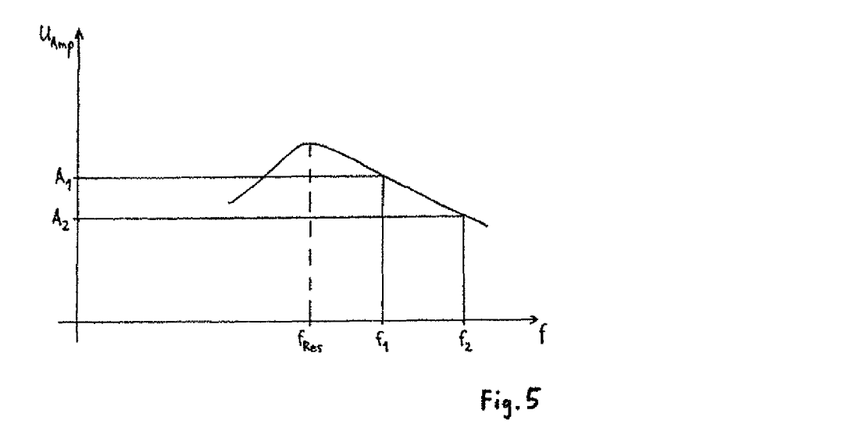
FIG. 5 is a characteristic curve of a class E amplifier.

Different options are available for modulation of the high-frequency signal. A first option involves supplying to the class E amplifier 44 a high-frequency driving signal 43, wherein the data to be transmitted are impressed on the driving signal 43 in the form of a frequency shift keying. This modulation method is illustrated in FIG. 5. FIG. 5 shows amplitude of the high-frequency signal produced by the class E amplifier 44 as a function of the frequency of the driving signal 43. The maximum amplitude is reached, when the frequency of the driving signal 43 corresponds to, for instance, the resonance frequency $f_{Res}$ of the class E amplifier 43. This resonance frequency can lie, for example, at 230 kHz. When the driving signal 43 has the frequency f1, a high-frequency signal of amplitude A1 is produced. When the frequency of the driving signal 43 has the frequency f2, then the amplitude of the high-frequency signal produced by the class E amplifier 44 lessens to the value A2. By changing the frequency of the driving signal 43, an amplitude modulation can be impressed on the high-frequency signal produced by the class E amplifier 44, in order, in this way, to transfer data to the sensor module.

In a preferred form of embodiment, microcontroller 41 includes an analog to digital converter 47, which monitors amplitude of the high-frequency signal produced by the class E amplifier 44 and, in given cases, so readjusts the frequency of the high-frequency driving signal 43, that the amplitude of the high-frequency signal is held constant. Since a control loop is provided in the microcontroller 41 for readjustment of the signal amplitude, the cable circuit 37 can adapt to different sensor modules having different energy consumptions.

Alternatively to the just described frequency shifting, other modulation methods could be used, in order to impress an amplitude modulation on the high-frequency signal. For example, a load modulation of the high-frequency signal produced by the class E amplifier 44 could be performed. In such a modulation method, the microcontroller 41 provides a low-frequency driving signal, wherein a load is switched on the output of the class E amplifier 43 corresponding to this driving signal. Through this load modulation, the high-frequency signal produced by the class E amplifier 44 is subjected to an amplitude modulation. In this way, with the assistance of a low frequency driving signal 43, the data to be transmitted can also be modulated onto the high-frequency signal.

In the reverse transmission direction, cable circuit 37 receives via the primary winding 46 a high-frequency signal transmitted from the sensor module. The received high-frequency signal goes to a demodulator 48, which demodulates the received signal and provides the so obtained data to the microcontroller 41. The demodulator 48 can be, for example, an envelope curve rectifier, which performs a differential evaluation of the envelope curve of the high-frequency signal. In the microcontroller 41, the data obtained from the demodulator 48 are conditioned and sent via the Tx output of the microcontroller 41 to the EIA-485 interface 40, whereupon they are led via the cable 38 to the measurement transmitter. Thus, the microcontroller 41 acts also in the reverse transmission direction as a repeater, which conditions the signal obtained from the demodulator 48 and sends it anew.

In the case of the form of embodiment illustrated in FIG. 4, voltage supply of the cable circuit 37 occurs from the measurement transmitter via the cable 38. In particular, the supply voltage $U_b$ is provided by the measurement transmitter. In such case, the cable 38 between measurement transmitter and cable circuit 37 can be up to several hundred meters long. Over this distance, there is a voltage drop of about 150 mV per 100 m of cable. For this reason, the voltage $U_b$ applied to the cable circuit 37 is subject to certain fluctuations. In order to be able to provide a stabilized supply voltage $V_{CC}$, the cable circuit 37 includes a voltage converter 49, which converts the voltage $U_b$ provided by the measurement transmitter into a defined operating voltage $V_{CC}$. It is of advantage to use a switching power supply as voltage converter 49, since switching power supplies have a very good efficiency of 90% and more. The stabilized supply voltage $V_{CC}$ is fed to the microcontroller 41, to the class E amplifier 44 and to the demodulator 48. Especially for the demodulator 48, a stabilized supply voltage is important, in order to prevent error in the decoding of the signals received from the inductive interface. Through application of a stabilized supply voltage, the amplitude modulated high-frequency signal can be produced with higher accuracy. Over all, through use of a stabilized supply voltage, danger of transmission errors in the data transmission via the inductive interface is lessened.

In addition to the already described advantages, which mainly concern the improving of the signal quality, the inserting of the microcontroller 41 into the signal path enables use of different functionalities provided by the programmable microcontroller 41. These new functionalities will now be described.

The integration of the microcontroller 41 into the signal path of the cable circuit 37 enables the providing of an index structure, with which particular parameters of the cable circuit 37 can be queried from the measurement transmitter. In the case of the solutions of the state of the art, the measurement transmitter could access only parameters of the sensor module; a targeted query of parameters of the cable electronics was not possible. In the case of the solution of the invention, in contrast, the microcontroller 41 integrated into the signal path can manage the particular parameters of the cable circuit 37 with the assistance of a separate index structure completely independent from the sensor module. In this way, the cable circuit is perceivable for the measurement transmitter as a separately addressable, functional unit. This provides especially the opportunity to address from the measurement transmitter, with the assistance of separate index structures, on the one hand, the parameters of the cable circuit 37, and, on the other hand, the parameters of the sensor module, and to access the two functional units separately. For example, the measurement transmitter could access under slot 0x01 the parameters of the sensor module and under slot 0xF1 the parameters of the cable circuit.

One or more of the following can be queried as particular parameters of the cable circuit 37: The type, the identification or the serial number of the cable circuit; manufacturer details for the cable circuit; and information regarding the version of the software installed in the cable circuit. Such data are frequently referred to in combined form under the term "Common Equipment Record" (CER).

@Furthermore, the cable circuit can be equipped with a temperature sensor, wherein, via the index structure, measured temperature of the cable circuit can be accessed. In an additional preferred form of embodiment, the microcontroller located in the cable circuit registers, with the assistance of an operating hours counter, the operating hours, wherein the present counter reading can be read-out with the assistance of the index structure. In an additional preferred form of embodiment, alternatively or supplementally, the number of operating hours is registered, during which a predetermined temperature has been exceeded.

With help of the index structure, all these parameters can be queried from the measurement transmitter and then displayed in a control room or on a PC. In this way, the user is given an overview concerning the present system components as well as the current status of the system. Moreover, the operating state of the cable circuit can be monitored from the measurement transmitter.

A microcontroller connected into the signal path of the cable circuit offers, moreover, the advantage that, via the microcontroller, a new type of data exchange is enabled between cable circuit and sensor module. In such case, the microcontroller can query for functionalities and coding methods supported by the sensor module. This data exchange will now be described in greater detail in the following.

In the case of the transmission system illustrated in FIG. 1, the measurement transmitter 5 is configured as master, while the cable circuit 3 and the sensor module 1 are operated in the slave mode. This means that the measurement transmitter 5 exercises control over the total data traffic between measurement transmitter, cable circuit and sensor module. The cable circuit can, consequently, not communicate independently with the sensor module.

In order, nevertheless, to enable an information exchange between cable circuit and sensor module initiated by the cable circuit, the microcontroller inserts it own communications into telegrams transmitted from the measurement transmitter to the sensor module. For example, the microcontroller can write unused bits of the telegrams, in order, in this way, to direct queries to the sensor module. When the sensor module supports such advanced functionalities, it can answer such queries, in that it impresses a corresponding response on a telegram transmitted from the sensor module to the measurement transmitter. For example, the sensor module can tell the microcontroller in such response, which coding methods it supports.

Figure 6:
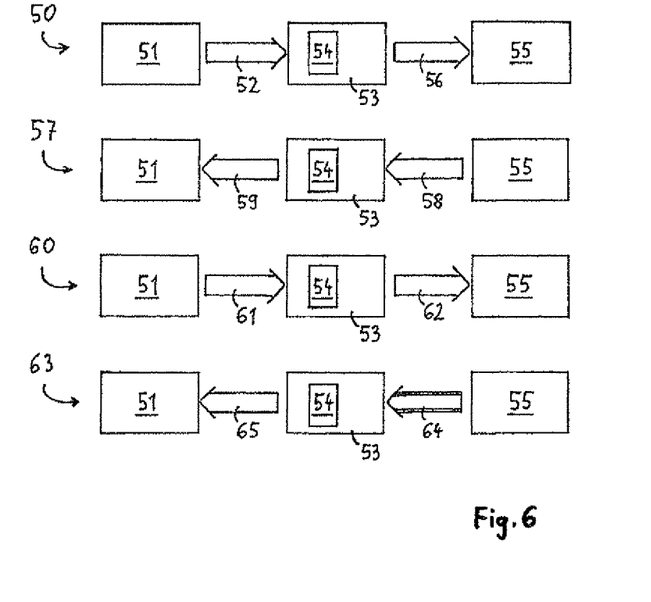
FIG. 6 is a data exchange between the cable circuit and the sensor module for negotiating an alternative coding method.

FIG. 6 shows the course of a communication between the cable circuit and the sensor module. In a first step 50, the measurement transmitter 51 sends a telegram 52 to the cable circuit 53. The cable circuit 53 includes a microcontroller integrated into the signal path. The microcontroller 54 modifies unused transmission bits of the telegram 52 and impresses on the telegram 52, in this way, a request to the sensor module 55. In case the telegram includes a test sum, the microcontroller modifies also this test sum corresponding to the changed transmission bits. The modified telegram 56 is then transmitted from the cable circuit 53 via the contactless interface to the sensor module 55. In this way, a new communication channel is opened between the cable circuit 53 and the sensor module 55. In the first step 50, the telegram 52 and the modified telegram 56 are transmitted in accordance with the coding method "non-return to zero" (NRZ), which is used according to standard for data transmission between the measurement transmitter 51, the cable circuit 53 and the sensor module 55.

When the sensor module is an older model, which does not support the described form of communication between cable circuit and sensor module, the request transmitted with the modified telegram remains unanswered. When the sensor module, in contrast, supports the communication of the invention between cable circuit and sensor module, then the request sent from the cable circuit is recognized and answered.

Here, it is assumed that the sensor module 55 supports the described communication with the cable circuit 53. In a second step 57, it is shown, how the sensor module 55 answers the request of the cable circuit 53. For answering the request, the sensor module 55 impresses on a telegram directed to the measurement transmitter 51 a corresponding response. In this response, the sensor module 55 informs concerning which functionalities it supports. For example, the sensor module 55 could in this response inform the cable circuit 53 concerning which other coding methods besides NRZ are supported. In order to encode the response to the request of the cable circuit 53 in the telegram, the sensor module 55 modifies unused transmission bits of the telegram and produces, in this way, a telegram 58 encoded with supplemental information, which is sent to the cable circuit 53. In the cable circuit, the telegram 58 is analyzed by the microcontroller 54. The microcontroller 54 learns, in this way, which functionalities are supported by the sensor module 55. Then, the microcontroller 54 sends a corresponding telegram 59 to the measurement transmitter 51. In such case, the additional information exchange between cable circuit 53 and sensor module 55 does not degrade the data traffic between measurement transmitter 51 and sensor module 55. Also in the second step 57, the data transmission occurs according to the coding method "non-return to zero" (NRZ), which is used according to standard for data transmission.

The microcontroller 54 knows now both the functional scope of the cable circuit 53 as well as also the functions supported by the sensor module 55. Especially, the microcontroller 54 knows from the response of the sensor module 55, which alternative coding methods besides NRZ are supported by the sensor module 55. The microcontroller 54 can now decide whether communication between the cable circuit 53 and the sensor module 55 should be switched to another coding method, and which coding method should be used for this communication in the future.

It is assumed, that the microcontroller reaches the decision to conduct the encoding of the telegrams transmitted via the contactless interface in the future by means of the coding method "8B10B", which is supported both by the cable circuit as well as also by the sensor module 55. For data transmission via the contactless interface, the coding method 8B10B offers in comparison to NRZ different advantages. One advantage is that a signal encoded according to 8B10B has a constant direct voltage part, while, in the case of NRZ, the direct voltage part is variable. Therefore, in the case of application of NRZ for data transmission via the contactless interface, under certain circumstances, there can be a loss of the average value of the voltage, as a result of series capacitances, and this can bring about transmission error. Consequently, transmission methods such as 8B10B or Manchester-encoding, in the case of which the direct voltage part is constant, are better suited for reliable data transmission via the contactless interface.

In a third step 60, the microcontroller 54 begins the process of causing the sensor module 55 to switch to 8B10B as the new encoding method. On a telegram 61, which the cable circuit 53 receives from the measurement transmitter 51, a corresponding switch over command is coded. To this end, the microcontroller 54 writes unused bits of the telegram 61. The modified telegram 62 is transmitted to the sensor module 55. It is to be noted that also in the third step 60 the entire communication still is encoded corresponding to the coding method NRZ.

In the sensor module 55, the telegram 62 received from the cable circuit 53 is analyzed, and the switching command contained in the telegram is recognized. Corresponding to this switching command, in a fourth step 63, the data transmission between the cable circuit 53 and the sensor module 55 is switched to the new coding method 8B10B. The next telegram 64, which is sent from the sensor module 55 to the cable circuit 53, is then according to the coding method 8B10B encoded. Since, from now on, the entire data transmission via the contactless interface is conducted according to the coding method 8B10B, the reliability of the data transmission between the cable circuit 53 and the sensor module 55 is improved.

At the cable circuit 53, the telegram 64 is received and evaluated by the microcontroller 54. Then, the microcontroller 54 forwards the received data in the form of telegram 65 to the measurement transmitter 51. In such case, the coding method NRZ used to this point on the transmission path between the cable circuit 53 and the measurement transmitter 51 can still be used. The data transmission between the cable circuit 53 and the measurement transmitter occurs via a cable, so that, on this transmission path, application of NRZ as coding method does not cause transmission problems. Critical is the data transmission via the contactless interface, in the case of which the application of an alternative coding method leads to an improving of the transmission quality.

By inserting the microcontroller 54 into the signal path of the cable circuit 53, a suitable coding method for data transmission between the cable circuit 53 and the sensor module 55 can be flexibly negotiated. Through use of an advantageous coding method, such as, for example, 8B10B encoding or Manchester encoding, the reliability of data transmission via the contactless interface can be improved.

The invention claimed is:

1. A method comprising the steps of:
   for measurement signal transmission in a measuring system, wherein the measuring system includes a measurement transmitter, a cable circuit having a signal processing unit, as well as a sensor module, the sensor module being galvanically isolated from the cable circuit, wherein signal transmission between the cable circuit and the sensor module occurs via a contactless interface, and wherein the signal transmission between the cable circuit and the sensor module occurs on an optical, inductive or capacitive path;
   transmitting a signal from the measurement transmitter to the cable circuit;
   receiving the signal by the cable circuit; conditioning of the received signal by the signal processing unit wherein the signal processing unit acts as a repeater, and wherein said signal processing unit is integrated into the signal path;
   modulating a carrier signal in accordance with the signal received from the measurement transmitter; and
   transmitting the modulated carrier signal via the contactless interface to the sensor module.

2. A method comprising the steps of:
   for measurement signal transmission in a measuring system, wherein the measuring system includes a measurement transmitter, a cable circuit having a signal processing unit, as well as a sensor module, the sensor module being galvanically isolated from the cable circuit, wherein signal transmission between the cable circuit and the sensor module
   occurs via a contactless interface, and wherein the signal transmission between the cable circuit and the sensor module occurs on an optical, inductive or capacitive path;
   transmitting a modulated carrier signal from the sensor module via the contactless interface to the cable circuit;
   receiving the modulated carrier signal by the cable circuit;
   demodulating the modulated carrier signal received via the contactless interface;
   conditioning of the demodulated signal by the signal processing unit;
   wherein the signal processing unit acts as a repeater, and wherein said signal processing unit is integrated into the signal path; and
   transmitting the conditioned signal from the cable circuit to the measurement transmitter.

* * * * *